(12) United States Patent
Ciochetti

(10) Patent No.: US 6,251,285 B1
(45) Date of Patent: Jun. 26, 2001

(54) METHOD FOR PREVENTING AN OBSTRUCTION FROM BEING TRAPPED BY SUCTION TO AN INLET OF A POOL FILTER PUMP SYSTEM, AND LINT TRAP COVER THEREFOR

(76) Inventor: Michael James Ciochetti, P.O. Box 1842, Clayton, Rabun County, GA (US) 30525

( * ) Notice: Subject to any disclaimer, the term of this patent is extended or adjusted under 35 U.S.C. 154(b) by 0 days.

(21) Appl. No.: 09/397,361

(22) Filed: Sep. 16, 1999

Related U.S. Application Data

(60) Provisional application No. 60/100,705, filed on Sep. 17, 1998.

(51) Int. Cl.[7] .................................................. B01D 35/147
(52) U.S. Cl. .................................. 210/741; 4/504; 4/509; 4/541.2; 137/526; 137/907; 210/805; 210/120; 210/169; 210/416.2; 210/472
(58) Field of Search .......................... 4/504, 509, 541.2; 137/493.1, 505.11, 526, 907; 210/739, 805, 120, 169, 416.2, 472, 741

(56) References Cited

U.S. PATENT DOCUMENTS

| | | | |
|---|---|---|---|
| 3,747,761 | * | 7/1973 | Heinrich, Jr. ........................ 210/232 |
| 3,935,106 | * | 1/1976 | Lipner ................................. 210/232 |
| 4,917,795 | * | 4/1990 | Sable et al. ......................... 210/120 |
| 5,265,631 | * | 11/1993 | Goetti ................................... 134/111 |
| 5,682,624 | * | 11/1997 | Ciochetti ................................. 4/509 |
| 5,865,601 | * | 2/1999 | Miller ....................................... 417/2 |
| 6,038,712 | * | 3/2000 | Chalberg et al. ........................ 4/507 |
| 6,098,648 | * | 8/2000 | Bertoia ................................. 137/112 |

* cited by examiner

Primary Examiner—Peter A. Hruskoci
(74) Attorney, Agent, or Firm—Gary M. Hartman; Domencia N. S. Hartman

(57) ABSTRACT

A method for preventing an obstruction from being trapped by suction to an inlet of a pool filter pump system, and a lint trap cover therefor. The cover is for installation on a lint trap unit located upstream of a pool filter pump, and is configured to vent air into the lint trap unit when a vacuum level within the unit exceeds a specified vacuum limit, as is the case if the drain or another inlet connected to the lint trap unit is partially or completely obstructed, such as by a child or foreign object. The rapid influx of air eliminates the vacuum within the pump and suction lines and, therefore, the resulting unsafe condition. The lint trap cover preferably has a damped mode of operation so that the pump system does not recover before the obstruction is removed. The cover can be manufactured as original equipment for the lint trap unit, or an existing cover can be modified to include the components required for venting the lint trap unit without requiring any modifications to the remaining pump system. As such, the present invention provides for a simple installation and can be readily fitted to an existing pool pumping system.

20 Claims, 2 Drawing Sheets

METHOD FOR PREVENTING AN OBSTRUCTION FROM BEING TRAPPED BY SUCTION TO AN INLET OF A POOL FILTER PUMP SYSTEM, AND LINT TRAP COVER THEREFOR

CROSS REFERENCE TO RELATED APPLICATIONS

This application claims the benefit of U.S. Provisional Application No. 60/100,705, filed Sep. 17, 1998.

BACKGROUND OF THE INVENTION

1. Field of the Invention

The present invention generally relates to pool safety equipment. More particularly, this invention relates to a lint trap cover for installation on a lint trap unit located upstream of a pool filter pump, in which the cover is configured to vent air into the lint trap unit when a vacuum level within the unit exceeds a specified vacuum limit, so that an obstruction is prevented from being trapped by suction to an inlet of the filter pump system.

2. Description of the Prior Art

A vacuum relief safety valve for preventing a child or an object from being trapped by suction to a drain or any other suction line of a swimming pool filter pump system is taught in U.S. Pat. No. 5,682,624 to Ciochetti, incorporated herein by reference. The Ciochetti safety valve offers significant safety advantages for many pool applications. However, it would be desirable if a safety valve were available that could be more readily retrofitted to an existing pool.

SUMMARY OF THE INVENTION

According to the present invention, there is provided method for preventing an obstruction from being trapped by suction to an inlet of a pool filter pump system, and a lint trap cover therefor. The cover is for installation on a lint trap unit located upstream of a pool filter pump, and is configured to vent air into the lint trap unit when a vacuum level within the unit exceeds a specified vacuum limit, as is the case if the drain or another inlet connected to the lint trap unit is partially or completely obstructed, such as by a child or foreign object. The lint trap cover preferably has a damped mode of operation so that the pump system does not recover before the obstruction is removed. According to the invention, the cover can be manufactured as original equipment for the lint trap unit, or an existing cover can be modified to include the components required for venting the lint trap unit without requiring any modifications to the remaining pump system. As such, the present invention provides for a simple installation and can be readily fitted to an existing pool pumping system.

In a preferred embodiment, the lint trap cover includes a valve assembly constructed as part of the cover. With the cover of this invention, a lint trap unit causes air to rapidly flow into the filter pump if a predetermined vacuum level is exceeded within the suction lines upstream of the lint trap unit, e.g., when the drain or one of the pool's suction line inlets becomes partially or completely obstructed. The rapid influx of air eliminates the vacuum within the pump and suction lines and, therefore, the resulting unsafe condition. In the preferred embodiment of this invention, the valve assembly includes a piston and flapper body that reciprocate within a bore, with the piston being connected to a diaphragm through which air is vented to the vacuum line. The flapper body damps the response of the piston within the cylinder such that the valve will remain open sufficiently long to cause the filter pump to completely lose its prime, but can recover quickly if only a very brief obstruction occurs.

An advantageous aspect of this invention is that an existing pool can be readily retrofitted with the safety valve of this invention. In particular, the invention does not necessitate that the drain or suction line be modified or reconstructed, such that the benefits of the invention can be realized without altering or disturbing the pool or suction line. Instead, the invention can be implemented by modifying an existing lint trap cover to include the safety valve or replacing the existing cover with one equipped with a safety valve in accordance with this invention.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE PREFERRED EMBODIMENT

Figure 2:
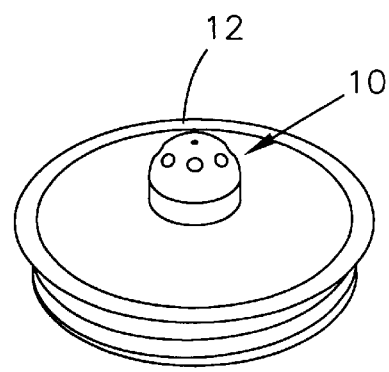
FIG. 2 shows the safety valve of FIG. 1 in the cover of a lint trap unit for a swimming pool filter pump system.
Figure 5:
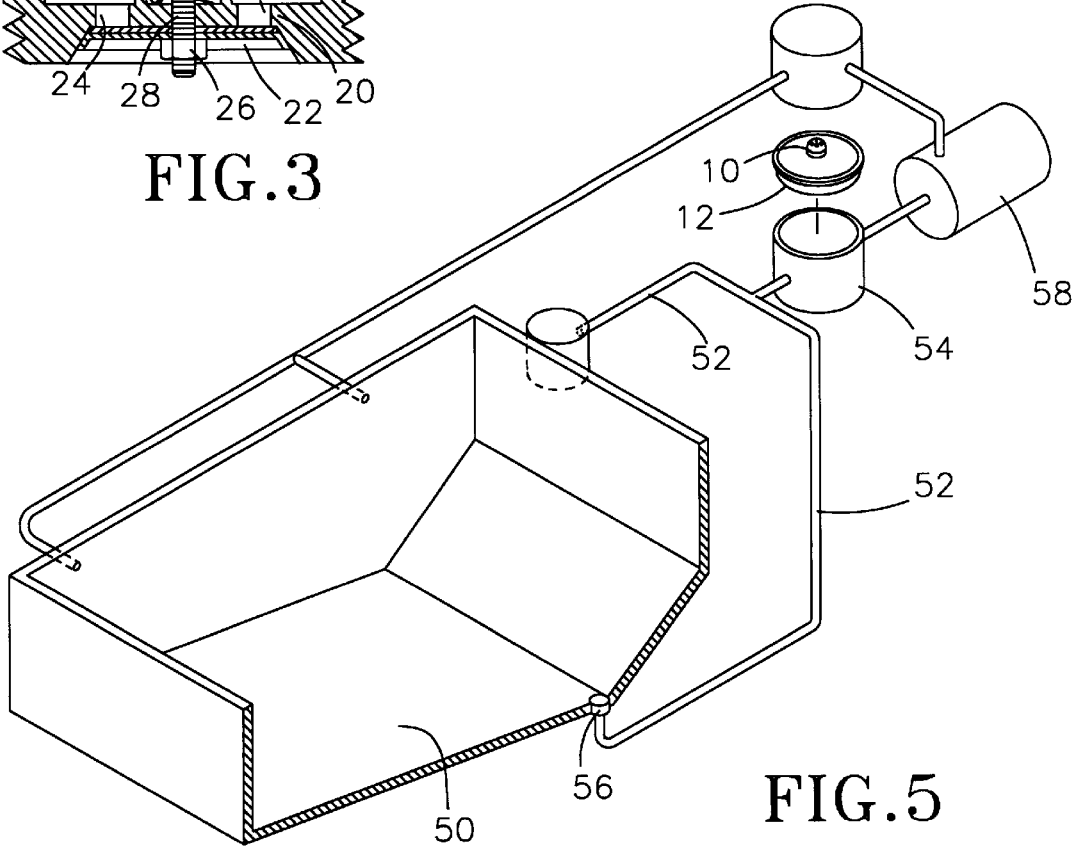
FIG. 5 schematically depicts a pool equipped with a lint trap unit in which the lint trap cover of FIG. 2 is installed.

A lint trap cover 12 equipped with a vacuum relief safety valve 10 in accordance with this invention is shown in FIG. 2. As shown with the pool 50 and filter 60 schematically represented in FIG. 5, the safety valve 10 is adapted to vent the pool suction line 52 on which a hair and lint trap unit 54 is installed to atmosphere in the event that the pool drain 56 becomes obstructed. By venting the suction line 52, the suction generated by the pool pump 58 can be reduced or the prime of the pump 58 can be completely lost. As a result, the vacuum that would otherwise trap the obstruction against the drain 56 is immediately released, allowing the obstruction to be easily freed. In the situation where a child obstructs the drain 56, the child can then either swim to safety or be easily assisted by others.

Figure 1:
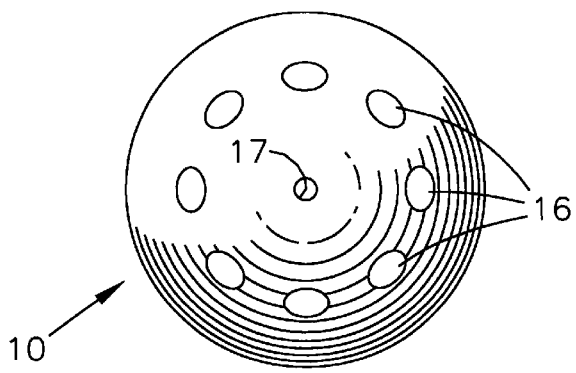
FIG. 1 is a top view of a vacuum relief safety valve in accordance with a preferred embodiment of this invention.
Figure 3:
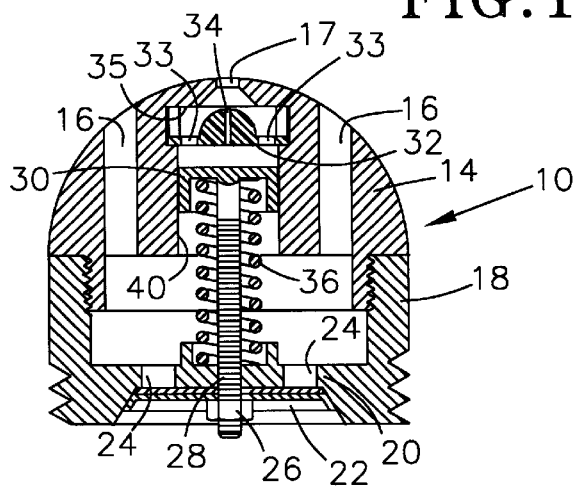
FIG. 3 is a cross-sectional view of a preferred embodiment of the safety valve of FIGS. 1 and 2.
Figure 4:
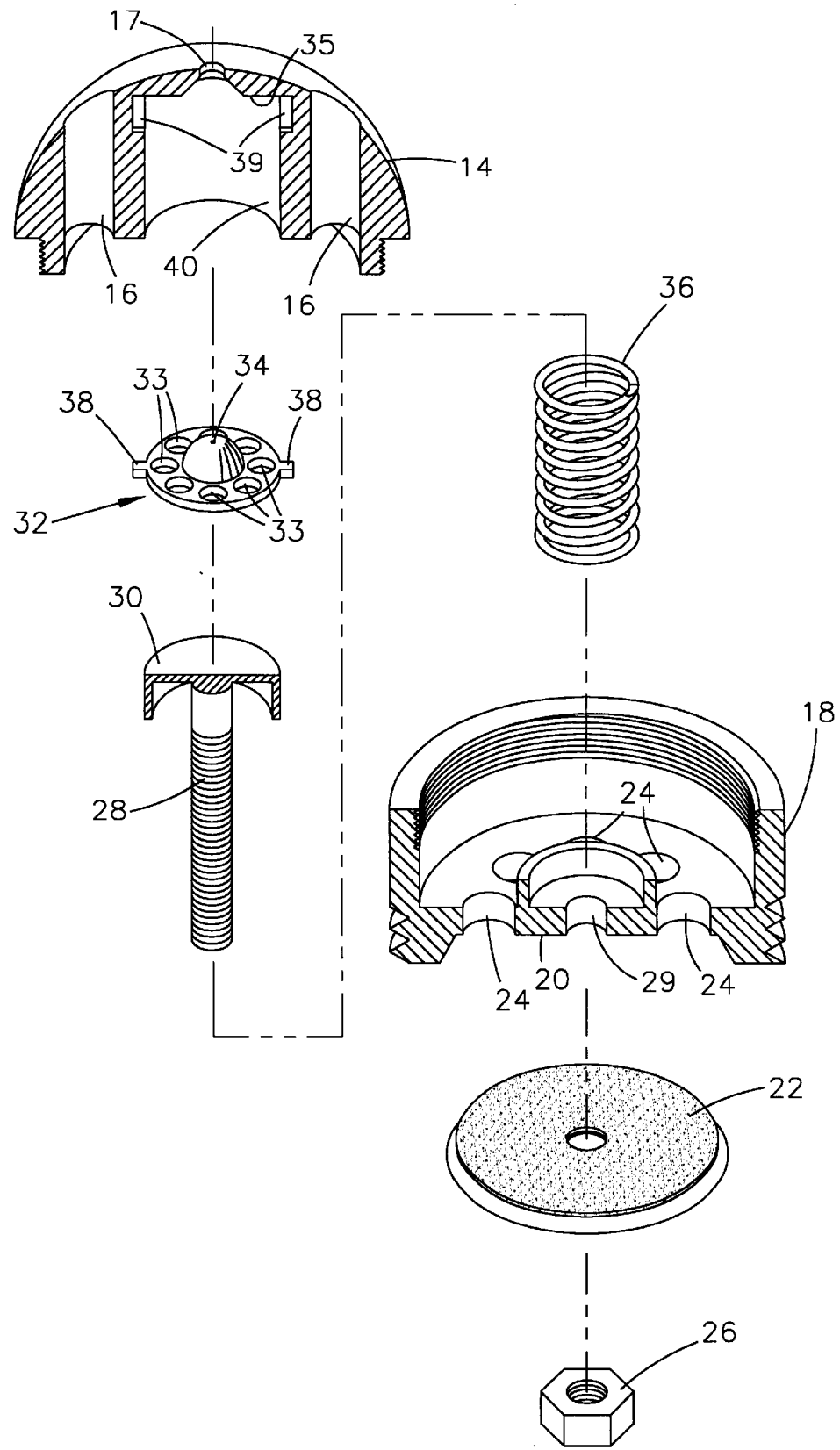
FIG. 4 is an exploded view of the safety valve of FIG. 3.

FIGS. 1, 3 and 4 are top, cross-sectional and exploded views, respectively, of the valve 10. As indicated above, FIG. 2 shows the valve 10 as being installed in the lint trap cover 12. As generally known and also depicted in FIG. 5, the cover 12 is used to close the access to the interior of the hair and lint trap unit 54, which is conventionally installed upstream of the pool pump 58 to prevent hair, lint and other debris from entering the pump 58. In a preferred embodiment shown in FIGS. 3 and 4, the valve 10 is generally constructed to include a two-piece housing, one of which is a dome 14 having a central bore 40 vented by openings 16 surrounding a central bleed hole 17. The second component of the two-piece housing is a casing 18 to which the dome 14 is threaded, though other assembly methods could be employed. As shown in FIGS. 3 and 4, the casing 18 is adapted to be threaded into an opening formed in the lint trap cover 12 show in FIG. 2. Alternatively, the casing 18 can be formed as an integral portion of the cover 12, so that only the dome 14 and the internal components of the valve 10 are installed on the cover 12. The embodiment in which the casing 18 is formed separately from the cover 12 permits retrofitting of an existing cover with the valve 10, while the alternative embodiment permits the existing cover to be replaced with the cover 12 equipped with the valve 10. In either case, the present invention equips a pool with the lifesaving vacuum relief capability afforded by the valve 10 without requiring any disassembly or reconstructing of the pool or its pumping system.

The casing 18 has a generally tubular shape, with the end of the casing 18 opposite the dome 14 being formed with a valve seat 20. The end of the casing 18 adjacent the seat 20 is formed with threads that enable the casing 18 to be threaded into a threaded bore in the cover 12 of the lint trap unit. A sealing means such as diaphragm 22 abuts against the lower surface of the seat 20, such that openings 24 formed in the seat 20 are closed by the diaphragm 22. At least the top surface of the diaphragm 22 is formed from a sufficiently pliable material to ensure that an airtight seal is achieved with the seat 20. The diaphragm 22 is mounted with an adjustment nut 26 on a shaft 28 that reciprocably extends through a central opening 29 (FIG. 4) in the seat 20. The upper end of the shaft 28 is threaded into or otherwise attached to an expelling means such as a piston 30 slidable within the bore 40 in the dome 14. A compression spring 36 is mounted on the shaft 28 and abuts the top of the valve seat 20 and the bottom of the piston 30, thereby biasing the piston 30 upward in the bore 40 and the diaphragm 22 into contact with the valve seat 20, such that the openings 24 are normally closed in an airtight manner.

Also within the dome 14 above the piston 30 is an impeding means such as a flapper body 32. The flapper body 32 is able to reciprocate within the bore 40, with its rotational orientation being maintained by a pair of guides 38 retained within a corresponding pair of grooves 39 in the bore 40. The flapper body 32 has a number of vent holes 33 surrounding a smaller central bleed hole 34. At least the upper surface of the flapper body 32 is made of a pliable material, so that the vent holes 33 are closed in a relatively airtight manner when the flapper body 32 is in its uppermost position and contacts a seat 35 formed within the dome 14 and surrounding the bleed hole 17. In this position, air is permitted to bleed through the bleed holes 17 and 34 in the dome 14 and flapper body 32, respectively.

According to the above construction, the openings 24 in the valve seat 20 do not permit the passage of air through the valve 10 unless a counteracting force acts on the spring 36, such as a sufficient vacuum on the backside of the diaphragm 22. As such, the biasing force generated by the spring 36 is overcome if the lint trap (and the suction lines connected to the lint trap) is subject to a sufficiently high vacuum, such as when the intake drain feeding the lint trap is blocked while the pump is running. The vacuum level at which the diaphragm 22 is pulled away from its seat 20 is dependent on the biasing force generated by the spring 36. In a preferred embodiment, this biasing force is adjusted with the nut 26 on the shaft 28, so that the valve 10 has an adjustable vacuum level above which venting is initiated into the lint trap unit. Once the diaphragm 22 is pulled off its seat 20 by a high vacuum condition within the lint trap, air is freely drawn through the valve 10 and into the lint trap through the openings 16 and 24 in the dome 14 and valve seat 20, respectively. As the piston 30 travels downwardly through the bore 40 with the diaphragm 22, air is also freely drawn into the bore 40 above the piston 30 through the bleed hole 17 in the dome 14 and the vent holes 33 in the flapper body 32, such that the movement of the piston 30 and diaphragm 22 are unimpeded.

In contrast, the return of the diaphragm 22 to its closed position against the seat 22 is damped because, as the piston 30 begins its upward travel, the flapper body 32 also moves upward within the dome 14 as a result of the vent holes 33 and bleed hole 34 being sufficiently small compared to the volume of area moved by the piston 30. The travel of the flapper body 32 is sufficiently short so that the body 32 quickly abuts the seat 35 of the dome 14, such that the vent holes 33 are closed against the seat 35. As a result, the remaining air within the bore 40 must be forced out by the piston 30 through the bleed hole 34 in the flapper body 32. In this manner, the diaphragm 22 is not permitted to reseat itself too quickly in response to a rapid drop in vacuum within the lint trap as air rushes into the lint trap through the openings 16 and 24 in the dome 14 and valve seat 20, respectively. Instead, venting of air through the openings 16 and 24 continues even after the high vacuum condition within the lint trap unit no longer exceeds the preselected vacuum level set with the piston shaft 28 and nut 26. As a result, rapid cycling of the valve 10 is prevented and a complete loss in prime can be achieved at the pump if a sufficient obstruction occurs at the drain or another suction line inlet. Alternatively, if the obstruction is sufficiently brief, it is foreseeable that the pump could regain its prime and continue to pump normally. However, as is the case where a child has become trapped at the pool drain, the diaphragm 22 will be sufficiently deterred from being reseated to cause a complete loss in prime at the pump. The resulting complete loss of vacuum within the pool pumping system enables the child to free himself or herself from the drain, or with the assistance of others.

From the above, it can be seen that the present invention provides a lint trap cover 12 equipped with a vacuum relief safety valve 10, enabling an otherwise conventional pool pumping system in which the cover 12 is installed to at least partially, and preferably completely, lose its prime if the pool drain or another suction line of the pool becomes obstructed. As a result, if a child is trapped against the pool drain or another pool outlet by the resulting vacuum created by the pumping system, the vacuum is sufficiently interrupted to enable the child to either swim to safety or be easily assisted by others. The cover 12 can be manufactured to integrally incorporate the casing 18, or have an opening into which the casing 18 is installed. In either case, the present invention enables the equipping of a pool with the lifesaving vacuum relief capability afforded by the valve 10 without requiring any disassembly or reconstructing of the pool or its pumping system.

While the invention has been described in terms of a preferred embodiment, it is apparent that other forms could be adopted by one skilled in the art. For example, the lint trap cover and its venting means could differ from that shown, yet still achieve the desired effect, including the preferred damped operation. As another example, the damping effect could be completely omitted; instead, the venting means could operate without any intentional damping so as to cease venting as soon as the selected vacuum limit is exceeded, or could be configured with a latch or other suitable device so as to lock in an open position, such that the filter pump completely loses its prime any time the selected vacuum limit is exceeded. Accordingly, it should be understood that the invention is not limited to the specific embodiment illustrated in the Figures. It should also be understood that the phraseology and terminology employed above are for the purpose of disclosing the illustrated embodiment, and do not necessarily serve as limitations to the scope of the invention. Accordingly, the scope of the invention is to be limited only by the following claims.

What is claimed is:

1. A lint trap cover for a lint trap unit of a pool pumping system, the lint trap cover comprising:
   means for closing access to the interior of the lint trap unit;
   means for venting air through said cover into the lint trap unit when a vacuum level within the lint trap unit exceeds a vacuum limit, capable of eliminating a vacuum in said pool pumping system.

2. A lint trap cover according to claim 1, including means for installing the lint trap cover in the lint trap unit.

3. A lint trap cover according to claim 1, wherein the venting means is a vacuum relief valve assembly mounted in the lint trap cover.

4. A lint trap cover according to claim 3, wherein the vacuum relief valve assembly comprises a portion that is integrally formed with the lint trap cover.

5. A lint trap cover according to claim 3, wherein the vacuum relief valve assembly is removably mounted within an opening in the lint trap cover.

6. A lint trap cover according to claim 5, wherein the vacuum relief valve assembly comprises threads engaged with threads in the opening in the lint trap cover.

7. A lint trap cover according to claim 3, wherein the vacuum relief valve assembly comprises:
   a first member in the lint trap cover;
   a second member removably secured to the first member;
   at least one opening through which air enters the lint trap unit through the vacuum relief valve assembly when the vacuum level within the lint trap unit exceeds the vacuum limit; and
   at least one bleed opening through which air escapes the vacuum relief valve assembly as the vacuum level within the lint trap unit drops below the vacuum limit.

8. A lint trap cover mounted to a lint trap unit of a pool pumping system, the lint trap cover comprising:
   at least one vent opening in fluidic communication with the lint trap unit;
   sealing means for closing the vent opening when the sealing means is disposed in a closed position and opening the vent opening when the sealing means is disposed in an open position, such that air is vented to the lint trap unit when the sealing means is in the open position;
   means for biasing the sealing means toward the closed position such that the vent opening is normally closed, the biasing means enabling the sealing means to move toward the open position when a vacuum level within the lint trap unit exceeds a vacuum limit established by the biasing means;
   a housing secured to the lint trap cover and enclosing the vent opening, the sealing means and the biasing means, the housing comprising a chamber, at least a first opening through which air is drawn into the lint trap unit when the sealing means is in the open position, and at least a second opening through which air is drawn into the chamber when the sealing means is in the open position;
   means for expelling air from the chamber through the second opening as the sealing means moves from the open position to the closed position; and
   means for impeding the expelling of the air from the chamber as the sealing means moves from the open position to the closed position, the impeding means comprising a body reciprocably disposed in the chamber between a first and second position, the body having at least a first bleed hole that fluidically communicates with the second opening of the housing when the sealing means is in the closed and open positions, the body having at least a second bleed hole that fluidically communicates with the second opening of the housing when the body is in the first position within the chamber, the second bleed hole being closed when the body is in the second position within the chamber.

9. A lint trap cover according to claim 8, wherein the impeding means damps movement of the sealing means when traveling from the open position to the closed position.

10. A lint trap cover according to claim 8, wherein the impeding means maintains venting of air into the lint trap unit for a duration after the vacuum level within the lint trap unit no longer exceeds the vacuum limit.

11. A lint trap cover according to claim 8, further comprising means for adjusting the vacuum limit established by the biasing means.

12. A lint trap cover according to claim 8, wherein the expelling means is attached to the sealing means.

13. A lint trap cover according to claim 8, wherein the impeding means is capable of reciprocating with respect to the expelling means.

14. A lint trap cover according to claim 8, including means for installing the lint trap cover in the pool pumping system.

15. A lint trap cover according to claim 8, wherein the vent opening is formed in a body that is removably mounted within an opening in the lint trap cover, the housing being removably secured to the body.

16. A lint trap cover according to claim 15, wherein the body has threads engaged with threads in the opening in the lint trap cover.

17. A method for preventing an obstruction from being trapped by suction to an inlet of a pool filter pump system, the method comprising the steps of:
   installing a lint trap cover on a lint trap unit installed in the pool filter pumping system, the lint trap cover comprising means for venting air therethrough; and
   venting air through the lint trap cover into the lint trap unit when a selectable vacuum level within the lint trap unit is exceeded, to eliminate a vacuum in said pool filter pump system and prevent said obstruction from being trapped.

18. A method according to claim 17, further comprising the step of manufacturing the lint trap cover to comprise the venting means, at least a portion of the venting means being integrally formed with the lint trap cover.

19. A method according to claim 17, further comprising the step of installing the venting means in an opening in the lint trap cover, at least a portion of the venting means being removably mounted within the opening.

20. A method according to claim 17, further comprising the step of continuing to vent air through the lint trap cover into the lint trap unit even after the vacuum level within the lint trap unit no longer exceeds the vacuum limit.

* * * * *